United States Patent

[11] 3,533,426

| [72] | Inventor | John A. Leonard |
| | | Windsor Locks, Connecticut |
| [21] | Appl. No. | 697,473 |
| [22] | Filed | Jan. 12, 1968 |
| [45] | Patented | Oct. 13, 1970 |
| [73] | Assignee | United Aircraft Corporation |
| | | East Hartford, Connecticut |
| | | a corporation of Delaware |

[54] ALTERNATING TO DIRECT FLUID PRESSURE CONVERSION
3 Claims, 7 Drawing Figs.

| [52] | U.S. Cl. | 137/81.5 |
| [51] | Int. Cl. | F15c 4/00, F15c 1/08 |
| [50] | Field of Search | 137/81.5; 73/(Inquired) |

[56] References Cited
UNITED STATES PATENTS

| 3,228,410 | 1/1966 | Warren et al. | 137/81.5 |
| 3,273,377 | 9/1966 | Testerman et al. | 137/81.5X |
| 3,292,648 | 12/1966 | Colston | 137/81.5 |
| 3,390,692 | 7/1968 | Hastie et al. | 137/81.5 |
| 3,398,758 | 8/1968 | Unfried | 137/81.5 |
| 3,411,520 | 11/1968 | Bowles | 137/81.5 |
| 3,428,067 | 2/1969 | Dexter et al. | 137/81.5 |
| 3,434,487 | 3/1969 | Bauer | 137/81.5 |

FOREIGN PATENTS

| 1,402,775 | 5/1965 | France | 137/81.5 |

Primary Examiner—Samuel Scott
Attorney—Melvin Pearson Williams

ABSTRACT: The output of a frequency modulated fluid temperature transducer is passed through a tuned, frequency sensitive fluid transmission line so that the various frequency components of the fluid transducer output leave the transmission line at different amplitudes in accordance with the characteristics thereof, the amplitudes then being convertible to direct or unilateral amplitude of pressure, the amplitude of which is an indication of the temperature being sensed by the fluid transducer.

Patented Oct. 13, 1970 3,533,426
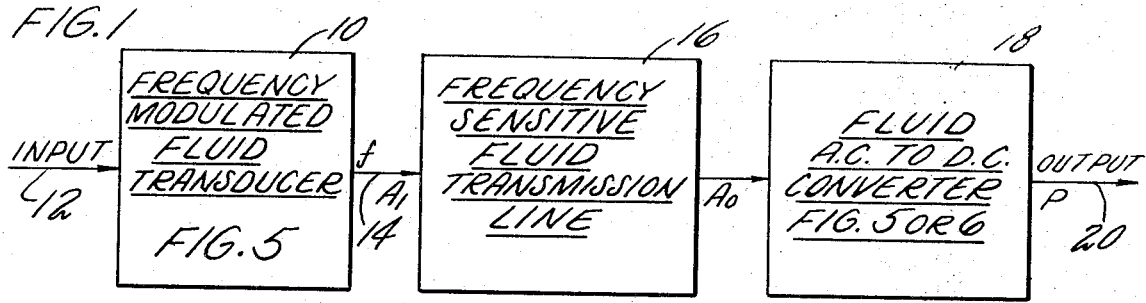
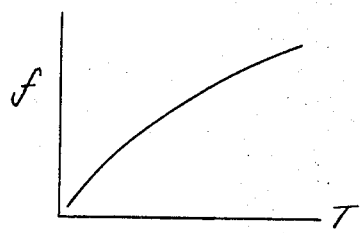 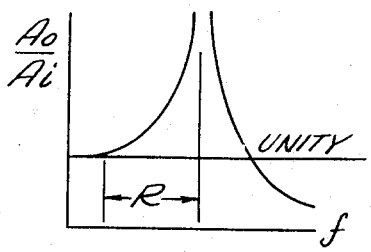 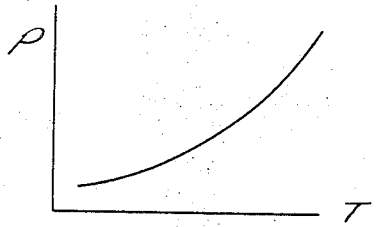
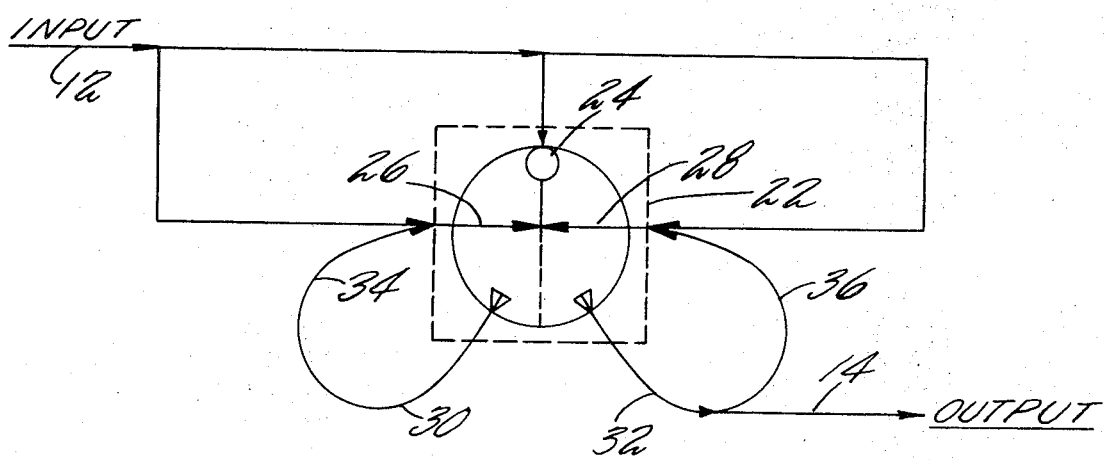
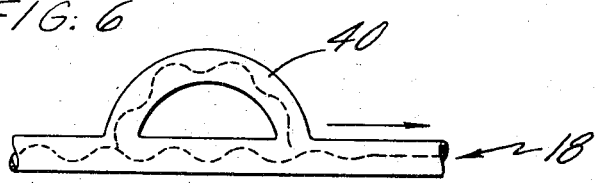
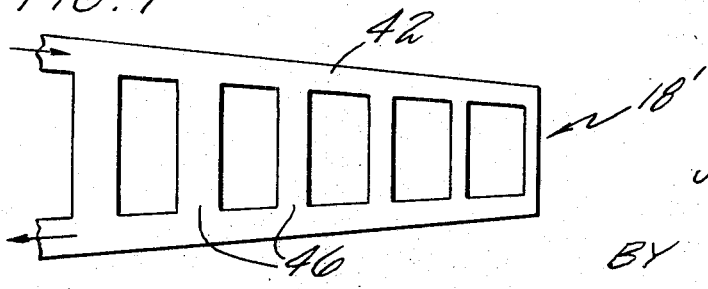
INVENTOR
JOHN A. LEONARD
BY Melvin Pearson Williams
ATTORNEY 3,533,426

ALTERNATING TO DIRECT FLUID PRESSURE CONVERSION

BACKGROUND OF THE INVENTION

1. Field of Invention

This invention relates to fluid sensing and control systems, and more particularly to time variant fluid signals.

2. Description of the Prior Art

In the fluid control art, recent advances have provided devices which can produce manifestions of conditions or events in the form of time variations in fluid pressures. An example is a proportional fluid amplifier with feedback in which both the control jets and the mainstream are fed fluid, the temperature of which is to be monitored. This results in an oscillation between the two output lines of the proportional amplifier and each of these output lines then will have a substantially sinusoidally varying pressure and flow rate. These devices are advantageous because they permit a greater accuracy in the sensing of very high temperatures. However, the utilization of the sinusoidally varying output flow is very difficult in fluid control systems known to the art. In fact, all sinusoidal or time varying fluid signals have heretofore been converted in suitable transducers into alternating current signals and the systems have been therefore of a hybrid nature including both fluid and electrical components. Of course, where high temperature applications are involved, electronic components will not generally be able to withstand the high temperature environment, or else are complex and expensive or require excessive bulk for temperature insulation and compensation. In any event, such systems have proved to be impractical in many applications.

SUMMARY OF INVENTION

An object of the present invention is to provide a total fluid system capable of responding to time variations in the flow and pressure of fluids, without the need for nonfluid equipment (such as mechanical or electrical components).

According to the present invention, time variations in pressure and/or flow of a fluid, which variations are indicative of a parameter which is to govern the operation of further responses in the system, are converted into levels of pressure and/or flow. In further accord with the present invention, frequency variations in pressure and flow are converted to amplitude variations in pressure and flow in the fluid by means of a resonant fluid transmission line. In accordance with further aspects of the present invention, the resonant fluid transmission line provides frequency detection of the pressure variation therein so that the amplitude of the various frequency components at the output of the resonant fluid transmission line will be frequency dependent; in other words, the output is still a time varying pressure signal, but the amplitude of the variations themselves will differ at different frequencies. Since the amplitude differs at different frequencies, a unit which will monitor the average magnitude of the frequency components will produce a different level of pressure output for inputs thereto from the resonant line which are at differing frequencies since the value or maximum or the peak-to-peak value of the frequency components varies with the frequency thereof.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 1 is a block diagram of a fluid system incorporating the present invention;

FIG. 2 is a simplified illustration of frequency output of the frequency modulated fluid transducer of FIG. 1 plotted as a function of temperature of the fluid input thereto;

FIG. 3 is a simplified illustration of the gain of the frequency sensitive fluid transmission line of FIG. 1 plotted as a function of the frequencies applied at the input thereto;

FIG. 4 is a simplified illustration of pressure out of the fluid a.c. to d.c. converter of FIG. 1 plotted as a function of temperature at the input to the system of FIG. 1;

FIG. 5 is a schematic illustration of a fluid amplifier connected to provide a frequency modulated fluid temperature transducer for use in the embodiment of FIG. 1;

FIG. 6 is a schematic illustration of a "Quincke Tube" fluid a.c. to d.c. converter for use in the embodiment of FIG. 1; and FIG. 7 is a schematic illustration of an alternative fluid a.c. to d.c. converter for use in the embodiment of FIG. 1 which comprises a ladder type fluid filter.

DESCRIPTION OF THE PREFERRED EMBODIMENT

Referring now to FIG. 1, an illustrative embodiment of a system in which the present invention may be incorporated includes a frequency modulated fluid transducer 10 (the details of which are illustrated in FIG. 5) which is adapted to monitor the temperature of fluid applied at an input line 12 thereto, so as to provide an output in a line 14 which comprises fluid at a nominal pressure having a frequency modulated maximum amplitude, the frequency of modulation of which is a function of the temperature of fluid in the input line 12 (FIG. 2). The fluid line 14 connects the transducer 10 to a frequency sensitive fluid transmission line 16, the characteristics of which are described hereinafter. The transmission line 16 has a gain characteristic (that is, the relationship of the amplitude of the output to the amplitude of the input: Ao/Ai) which varies with different frequencies, as shown in FIG. 3. The various frequency components in the ripple of pressure of the fluid passing from the fluid transmission line 16 to a fluid a.c. to d.c. converter 18 will be at amplitudes which are proportional to the frequency thereof. The fluid a.c. to d.c. converter 18 measures the average value of the amplitude of pressure applied thereto, and provides a time-varying steady or direct amplitude at the system output 20. As is illustrated in FIG. 4, the pressure P at the output 20 is an increasing function of the temperature T at the input 12 of the system shown on FIG. 1. This provides a time-varying unilateral pressure which is a function of the temperature being monitored, and this time-varying unilateral pressure may be used to control further fluid equipment, thereby avoiding the necessity of hybrid electrical and/or mechanical combinations with fluid in order to perform useful work from the pressure variations that are indicative of temperature in the input 12.

The details of the frequency modulated fluid transducer 10 are illustrated in FIG. 5. Therein, a fluid amplifier 22 is so connected as to form a temperature sensitive frequency modulated transducer, in accordance with the teachings of the prior art. Briefly, the input line 12 is connected to the power nozzle 24 and to each of the control nozzles 26, 28 of the fluid amplifier 22. The output channels 30, 32 are connected to respective ones of the control nozzles 26, 28 by feedback lines 34, 36 and additionally, an output tapoff is provided as the output 14 of the transducer 10. As is known in the prior art, the frequency in the output 14 is dependent upon the temperature of the fluid which enters the input 12 and the fluid dynamics of the feedback lines 34, 36. More specifically, when fluid is applied to the device, the lack of identity in all of the paths and channels will cause some amount of imbalance in the pressure and flow applied by the control nozzles 26, 28, and this imbalance will cause a proportional feedback through the loops 34, 36 so that the flow in these loops will vary in an out of phase alternating fashion, a high flow into one of the control nozzles 26, 28 causing, in turn, a high flow at the opposite output channel 32, 30 respectively, which in turn causes a high flow in the opposite control nozzles 28, 26 respectively. The rapidity of this process depends upon the rate at which pressure variations will travel through the feedback lines 34, 36 and this rate is in turn dependent upon temperature, as is well known in the art. Thus, the output 14 of the transducer 10 will be at a nominal pressure (depending upon the pressure of the input 12) with timed variations in the maximum of this pressure, which variations are a function of the temperature of the fluid at the input 12.

Although a frequency modulated fluid temperature transducer is illustrated as being the source in the system of FIG. 1, it should be understood that other sources of alternating fluid pressure and/or flow may be utilized in accordance with the present invention without departing from the principles of the invention.

The frequency sensitive fluid transmission line 16 may comprise a conduit or a pipe having characteristics of inside diameter and length that will cause it to have a variable gain characteristic (that is, the ratio of the output amplitude to the input amplitude varies for various frequency components) as described more fully below. The amplitude ratio illustrated in FIG. 3 for a frequency sensitive fluid transmission line, as is known in the art, is defined as a function of the frequency of the variations in input fluid pressure (Fi), the resonant frequency of the fluid transmission line (Fo), and the ratio of specific heats (R):

$$\frac{Ao}{Ai} = \frac{\frac{Fi^2}{Fo^2}}{\sqrt{\left(1-\frac{Fi^2}{Fo^2}\right)^2 + \left(2R\frac{Fi}{Fo}\right)^2}}$$

The RMS unit is used herein as an a.c. to d.c. converter, rather than as an averager, and its function is to provide an output signal which is a function of the peak-to-peak variation in input signal. The a.c. to d.c. converter could be an element of the type which is marketed by several manufactures. Such an element may include what is known in the art as a "Quincke Tube" (FIG. 6) which includes a resonating bypass 40 to remove alternating ripple in fluid flow by reinforcing the low pressure areas with high pressure fed through the bypass so as to cause the output to be the mean average of the rippled pressure.

The a.c. to d.c. converter, on the other hand, may be one of several known types such as a ladder type fluid filter which has a pair of parallel lines 42, 44 of progressively smaller size which are interconnected by ladder rungs 46 of progressively smaller size so that it is frequency responsive, the output amplitude being high for low frequencies and low for higher frequencies. Although this device is not linear, it is proportional and provides a good range of operation.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

I claim:
1. An alternating to unilateral fluid pressure converter adapted for use with a source of temperature dependent frequency modulated fluid signals, comprising:
  a frequency sensitive fluid transmission line tuned to the frequency of the temperature dependent frequency modulated fluid signals adapted for connection to the source of time variant frequency modulated fluid signals for amplitude modulating the frequency modulated fluid signals; and
  means connected to the output of said transmission line for converting the time variant amplitude modulated alternating signals received from said transmission line to unilateral time varying signals.

2. The pressure converter according to claim 1 wherein said last-named means comprises a "Quincke Tube".

3. The pressure converter according to claim 1 wherein said last-named means comprises a ladder type fluid filter.